United States Patent
Koumaru (10) Patent No.: US 7,910,029 B2
(45) Date of Patent: Mar. 22, 2011

(54) CONTROL METHOD OF INJECTION MOLDING AND CONTROL APPARATUS OF INJECTION MOLDING

(75) Inventor: Ikuo Koumaru, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/487,172

(22) Filed: Jun. 18, 2009

(65) Prior Publication Data
US 2009/0315205 A1 Dec. 24, 2009

(30) Foreign Application Priority Data
Jun. 20, 2008 (JP) ................. 2008-162352

(51) Int. Cl.
*B29C 45/77* (2006.01)
(52) U.S. Cl. .................. 264/40.1; 425/145
(58) Field of Classification Search .......... 264/40.1, 264/40.3, 40.7; 425/145, 146, 149
See application file for complete search history.

(56) References Cited

U.S. PATENT DOCUMENTS

| | | | | |
|---|---|---|---|---|
| 5,514,311 A | * | 5/1996 | Shimizu et al. | 264/40.1 |
| 5,817,258 A | * | 10/1998 | Ito et al. | 264/40.1 |
| 6,325,954 B1 | * | 12/2001 | Sasaki et al. | 264/40.1 |
| 6,616,871 B1 | * | 9/2003 | Iimura et al. | 264/40.1 |
| 6,835,337 B2 | * | 12/2004 | Sasaki et al. | 264/40.1 |
| 6,994,537 B2 | * | 2/2006 | Liu et al. | 264/40.1 |

FOREIGN PATENT DOCUMENTS

| | | |
|---|---|---|
| JP | 03-243321 | 10/1991 |
| JP | 2001-277322 | 10/2001 |

* cited by examiner

*Primary Examiner* — Jill L Heitbrink
(74) *Attorney, Agent, or Firm* — SNR Denton US LLP

(57) ABSTRACT

A control method of injection molding includes the steps of: filling molten resin in an injection molding die by velocity control until a detection value of a filling pressure of the molten resin reaches a first set pressure value; filling the molten resin by switching control from the velocity control to pressure control by which the control is performed at the first set pressure value at a time point when the detection value of the filling pressure reaches or exceeds the first set pressure value; and switching the control to holding pressure control by which the control is performed at a second set pressure value at a time point when the filling velocity drops to or below a set velocity while filling is performed by the pressure control.

13 Claims, 6 Drawing Sheets

CONTROL METHOD OF INJECTION MOLDING AND CONTROL APPARATUS OF INJECTION MOLDING

BACKGROUND OF THE INVENTION

1. Field of the Invention

The present invention relates to a control method of injection molding and a control apparatus of injection molding suitable for the use of the control method.

2. Background Art

An injection molding machine generally includes a molding unit, a clamping unit, and an injection unit, and the molding unit has a stationary die and a movable die. Mold closing, mold clamping, and mold opening of the molding unit are performed by allowing the movable die to move forward and backward using the clamping unit. A cavity space is defined between the stationary die and the movable die in association with the mold clamping. The injection unit has a heating cylinder and a screw provided to be rotatable and movable forward and backward inside the heating cylinder. It also has a metering motor and an injection motor for allowing the screw to rotate and move forward and backward.

In the metering process, resin is forced forward by rotating the screw and stored ahead of the screw inside the heating cylinder. In the injection process, the stored resin is injected from an injection nozzle provided at the front end of the heating cylinder by allowing the screw to move forward. The resin thus flows through a runner inside the molding unit and enters into the cavity space via a gate, so that it is filled in the cavity space. By cooling the molding unit thereafter, the resin inside the cavity space is cooled and solidified to consequently form a molded article.

A control method and a control apparatus of injection molding of this type in the related art are described, for example, in JP-A-2001-277322 (hereinafter, referred to as patent document 1). The patent document 1 describes a filling process control method and a control apparatus for an injection molding machine. According to the filling process control method for an injection molding machine of the patent document 1, when the screw has moved forward until it reaches a predetermined position in the filling process of injection molding, the screw is returned to a set position at a set velocity for a necessary pressure wave to be formed by means of depressurization.

According to the invention of the patent document 1 (hereinafter, referred to as the first related art), when the screw has moved forward until it reaches the predetermined filling position (set value), the screw is moved backward to the set position at the set velocity. Accordingly, because the screw can be operated in response to the velocity control, abrupt depressurization is enabled, which makes it possible to set a necessary pressure waveform as desired. It is therefore expected to achieve an advantage that the quality of a molded article can be stabilized (see Paragraph [0030] of the patent document 1).

Another example of the injection molding machine in the related art is described, for example, in JP-A-3-243321 (hereinafter, referred to as patent document 2). The patent document 2 describes a control method of an electric injection molding machine using a servo motor as the drive source for injection and holding pressure. The control method of the electric injection molding machine of the patent document 2 relates to a control method of an electric injection molding machine for switching the injection process and the holding pressure process in the injection apparatus using a servo motor as the drive source. According to this control method, a minor feedback of an injection velocity is provided to a holding pressure control system and this minor feedback is shared with a velocity feedback system of an injection velocity control system. An operation signal to the minor feedback of an injection velocity of the holding pressure control system during the injection process is compared with an injection velocity set signal, and either one of these two signals, whichever is the smaller, is selected and used as a velocity command signal.

According to the invention of the patent document 2 (hereinafter, referred to as the second related art), the continuity of an injection pressure when the control is switched from the injecting process to the holding pressure process is ensured to protect the die. It thus becomes possible to obtain a satisfactory molded article by preventing the occurrence of flash. Further, it is expected to achieve an advantage that accuracy of a molded article can be improved by prolonging the life of the electric injection molding machine (see the column of Advantages of the Invention in the patent document 2).

Incidentally, TV sets and mobile electric appliances in these days have been becoming thinner and extremely thin molded articles are increasing. In order to meet such an increase, a high-velocity injection molding machine is in widespread use so that a molding material that is fluidized by heating is spread into every corner of a space for molded article (cavity space) inside the die before it is cooled and solidified. With the high-velocity injection molding by this high-velocity injection molding machine, it is obvious that a pressure loss occurring inside the die increases exponentially from the viewpoint of flow dynamics. In addition, with the high-velocity injection, inertia of the injection apparatus is so large that it becomes difficult to control the screw velocity when the control is switched to the holding pressure process. This poses a problem that an overshoot of injection pressure occurs.

To overcome this problem, the first related art performs control to reduce a pressure by moving the screw backward temporarily at the time of V (velocity)-P (pressure) switching by the control by which the control is switched from the injection process to the holding pressure process. Because the screw is moved backward temporarily before the holding pressure control is started, there is a delay in the follow-up to the subsequent holding pressure control. This delay makes the holding pressure control difficult for an extremely thin molded article. Further, a temporal overshoot causes a variance in a molded article, which poses a problem that adverse influences are given to the life of the die.

In the second related art, in order to prevent an overshoot of pressure when the control is switched from the injection process to the holding pressure process, the minor feedback of an injection velocity is provided to the holding pressure system and a velocity at the time of switching is controlled by sharing the minor feedback with the velocity feedback system of the injection velocity control system. This configuration, however, consequently causes a pressure drop because the screw is decelerated before the filling in the injection process is completed. Accordingly, there is a problem that a short shot readily occurs in an extremely thin molded article or a thin portion at the end of filling.

The problems discussed above will now be described more concretely in the following.

Figure 1:
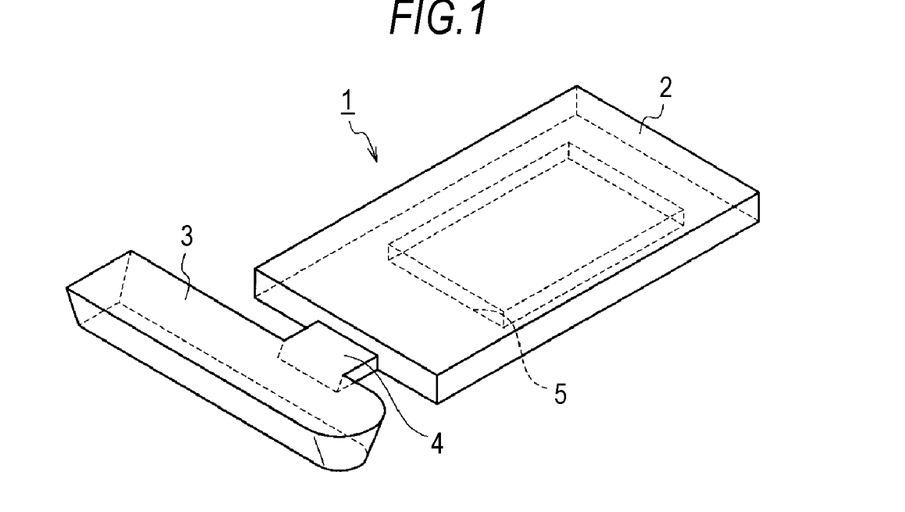
FIG. 1 is a perspective view of a molded article manufactured by an injection molding machine according to an embodiment of the present invention and a runner portion and a gate portion thereof.

FIG. 1 is a view showing a concrete example of a molded article having a thin portion. The molded article 1 includes a product portion 2, a runner portion 3, and a gate portion 4 connecting the product portion 2 and the runner portion 3. The product portion 2 is formed of a rectangular thin plate member and a rectangular recessed portion 5 is provided in one surface thereof. The bottom of the recessed portion 5 of the production portion 2 is a product thin portion that is made thinner than the other portions.

Figure 4:
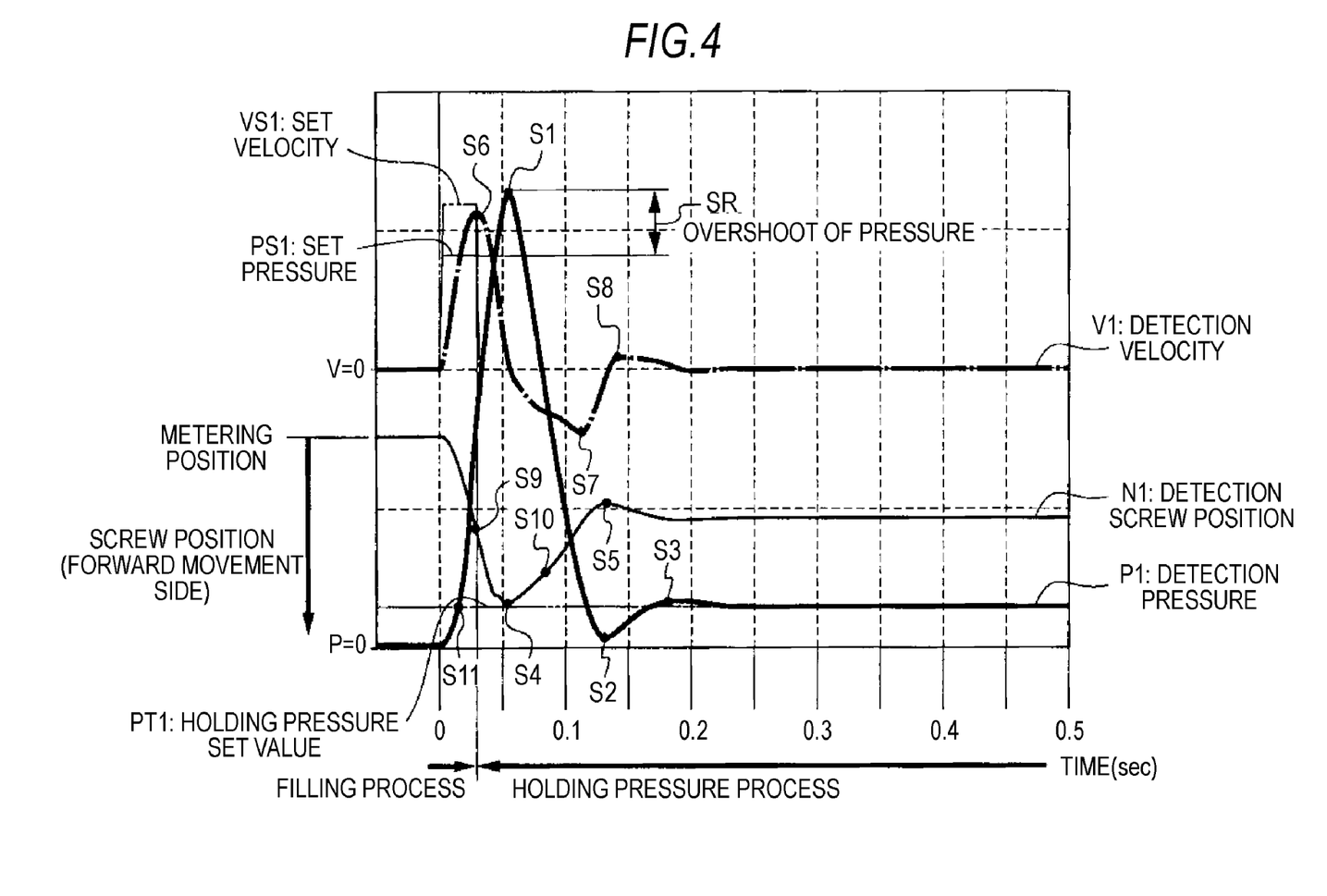
FIG. 4 is a graph showing the recorded waveforms of an injection velocity, a filling pressure, and a screw position in the case of molding by an injection molding method in the related art.

For the molded article 1 having such a thin portion, a filling work by high-velocity injection is necessary because the filling of a molten molding material has to be completed before it is cooled and solidified inside the die. FIG. 4 shows a case example of a velocity waveform, a pressure waveform, a screw position in the case of molding by a molding method and control in the related art. Referring to FIG. 4, a graph indicated by a thick solid line represents a detection pressure P1, a graph indicated by a thin solid line represents a detection screw position N1, and a graph indicated by a thick alternate long and short dash line represents a detection velocity V1. Further, the abscissa is used for a molding time in FIG. 4. It shows an elapse of 0.5 second from the start of molding. About 0.03 second from the start of molding is the control of the filling process and the controls shifts to the holding pressure process thereafter.

Referring to FIG. 4, the detection pressure P1 rises abruptly from the start of molding and reaches the peak at a time point S1 (about 0.05 second from the start), after which it drops abruptly and returns to the vicinity of zero (0) at a time point S2 (about 0.13 second from the start). It then rises slightly and shifts to a preset specific pressure at a time point S3 (about 0.18 second from the start) and holds this pressure thereafter. The detection screw position N1 starts moving forward from the start of molding and reaches the front end at a time point S4 (about 0.05 second from the start). It then changes to a backward movement and returns to about half the distance at a time point S5 (about 0.13 second from the start). It subsequently moves forward slightly and maintains this position. The detection velocity V1 rises from the start of molding and reaches the peak at a time point S6 (about 0.03 second from the start), after which it drops until it shifts further in a minus direction and changes to rise at a time point S7 (about 0.12 second from the start). Subsequently, it returns to almost the initial velocity (0) at a time point S8 (about 0.14 second from the start) and holds this stopped state.

In this manner, according to the related art shown in FIG. 4, when the screw moves forward (moves downward in FIG. 4), the detection velocity V1 rises (upward in FIG. 4) so as to respond to the set speed VS1 at the start of injection, and so does the detection pressure P1. For the detection pressure P1 to exceed the set pressure PS1 at a time point S11 before the detection velocity V1 reaches the set velocity VS1, the control apparatus outputs a deceleration control signal at the time point S6. However, because the injection apparatus has inertial energy, the pressure rises instantaneously to the peak pressure at the time point S1. A difference SR between the peak pressure and the set pressure PS1 in this instance represents an overshoot of pressure.

Also, in this example, the V (velocity)-P (pressure) switching is performed while the screw is moving forward as indicated at the time point S9 and the control is switched from the filling process to the holding pressure process. The screw, however, keeps moving forward up to the peak pressure at the time point S1 and reaches the end of forward movement at the time point S4. This phenomenon is referred to as over packing and occurs when a molding material in an amount exceeding the capacity of the cavity space (space for molded article) in the die is placed into the die. This phenomenon not only develops remaining stress in a molded article, but also causes a defective dimension, a dimensional variance, and flash. The control to lower the pressure is continued after the control is switched to the holding pressure process and the screw position is abruptly moved backward as indicated at a time point S10. Accordingly, because the detection pressure P1 drops to or below the holding pressure set value PT1 as at the time point S2, a behavior for depressurization is induced, after which the control to hold the detection pressure P1 at the holding pressure set value PT1 is performed.

In the molding of a thin product as in the case example described above, the control method in the related art causes an overshoot of pressure during the filling and depressurization occurs after the control is switched to the holding pressure. It is therefore extremely difficult to control the filling pressure and the holding pressure, which possibly results in a crucial problem as to the quality of a molded article. In addition, there is a problem that the occurrence of a peak pressure shortens the life of the die and a clamping force necessary for the injection molding machine is increased.

SUMMARY OF THE INVENTION

The injection molding machine in the related art has the following problems. That is, because the screw is moved backward temporarily before the holding pressure control is started, there is a delay in the follow-up to the subsequent holding pressure control, and this delay makes the holding pressure control difficult for an extremely thin molded article. Also, because the screw is decelerated before the filling in the injection process is completed, the pressure is dropped, which readily causes a short mold in an extremely thin molded article or a thin portion at the end of filling.

It is therefore desirable to manufacture a thin product efficiently by improving the moldability while preventing the occurrence of a peak pressure during the filling (injection) by compressing a molding material at the beginning of the filling process to accumulate internal energy induced by compression in the molding material and filling the molding material by utilizing the internal energy accumulated in the molding material.

According to an embodiment of the present invention, molten resin is filled in an injection molding die by velocity control until a detection value of a filling pressure of the molten resin reaches a first set pressure value. The molten resin is further filled by switching the control from the velocity control to pressure control by which the control is performed at the first set pressure value at a time point when the detection value of the filling pressure reaches or exceeds the first set pressure value. Then, the control is switched to holding pressure control by which the control is performed at a second set pressure value at a time point when the filling velocity drops to or below a set velocity while filling is performed by the pressure control.

Also, according to an embodiment of the present invention, in a case where the molten resin is filled in the injection molding die, the molten resin is filled in the die until the molten resin becomes a predetermined state. It is then controlled in such a manner that the molten resin is flown further to be filled in the die using internal energy that is accumulated in the filled resin by utilizing the compressive strength, which is a physical property of the resin filled in the die until it becomes the predetermined state.

Also, according to an embodiment of the present invention, a pressure detection portion that detects a filling pressure of resin being filled in an injection molding die, a velocity detection portion that detects a filling velocity of the resin, and a filling control portion are provided. The filling control portion fills molten resin by velocity control according to a velocity detected by the velocity detection portion until the filling pressure of the molten resin detected by the pressure detection portion reaches a first set pressure value. Further, at a time point when a detection value of the filling pressure detected by the pressure detection portion reaches or exceeds the first set pressure value, the filling control portion switches control from the velocity control to pressure control by which the control is performed at the first set pressure value. Subsequently, the filling control portion switches the control to holding pressure control by which the control is performed at a second set pressure value at a time point when the filling velocity detected by the velocity detection portion drops to or below a set velocity while filling is performed by the pressure control.

According to embodiments of the present invention, the pressure of the molding material being filled is detected and the filling control is switched from the velocity control to the pressure control at a time point when the internal energy is accumulated in the molding material. Thereafter, the filling pressure is controlled to be continuously flat by utilizing the internal energy of the molding material. It thus becomes possible to prevent the occurrence of a peak pressure during the filling process, which in turn enables the filling of the molding material at a relatively low pressure. In addition, because over packing can be prevented, it becomes possible to prevent an overshoot of injection pressure that occurs immediately after the filling.

DESCRIPTION OF THE PREFERRED EMBODIMENTS

Figure 2:
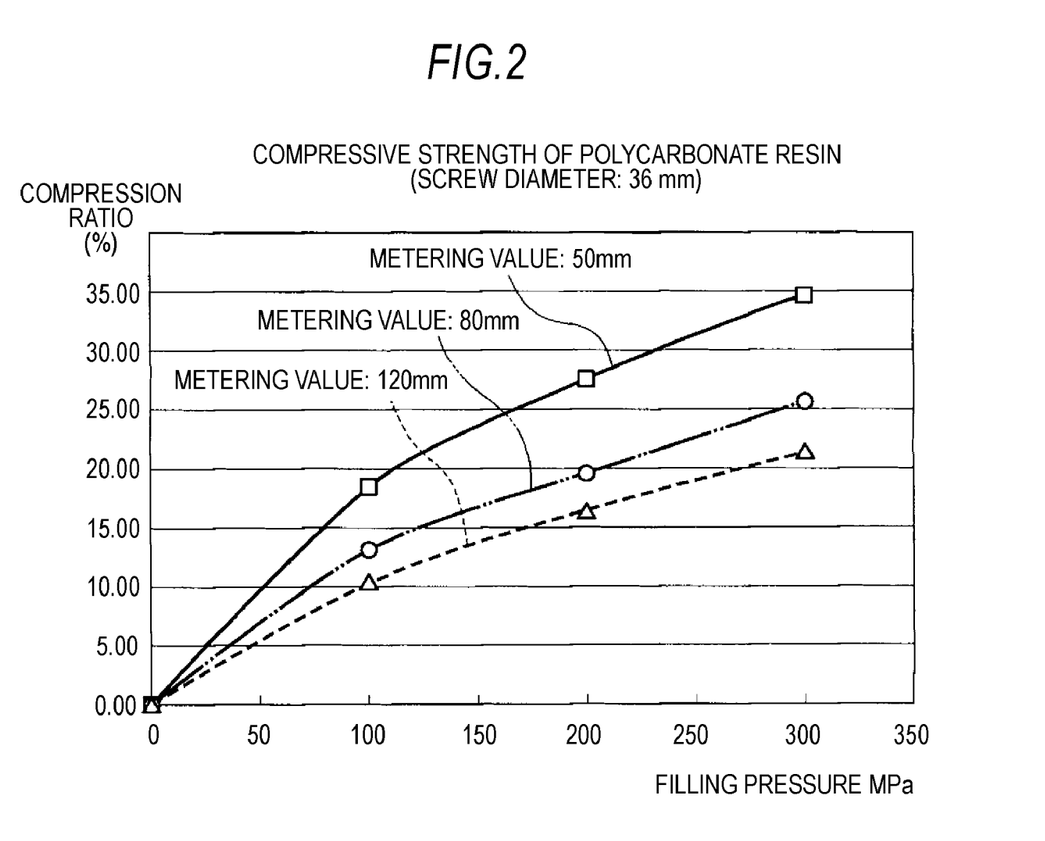
FIG. 2 is a graph used to describe the compressive strength of rein used in the injection molding machine according to an embodiment of the present invention.

FIG. 2 is a graph showing material data obtained from an experiment performed to describe the compressive strength of a molding material that constitutes the principle of the present invention. In this experiment, PC (polycarbonate) was used as a molding material with an actually used screw in-line injection molding machine. A metering value (stroke of the screw) of the screw having a diameter of 36 mm was set to 50 mm, 80 mm, and 120 mm. A pressure of the molding material and the position of the screw when the molding material was injected under the conditions specified above were recorded. The result obtained by calculating the compressive strength of the molding material PC on the basis of the recorded data is plotted on the graph of FIG. 2. In FIG. 2, the abscissa is used for the filling pressure (MPa) and the ordinate is used for the compression ratio (%).

Referring to FIG. 2, the relation of the filling pressure and the compression ratio varies linearly and relatively significantly from the start of filling under each condition until the filling pressure exceeds 100 MPa. At or around a point when the filling pressure exceeds 100 MPa, the filling pressure starts to vary gently. Thereafter, the filling pressure varies linearly but relatively slightly. Also, there is a tendency that the compression ratio becomes lower as the metering value becomes larger. This phenomenon is thought to occur because the screw undergoes a reactive force induced by the internal energy accumulated in the molding material, and it describes that the internal energy accumulated in the molding material increases more as the injection capacity becomes larger.

Hereinafter, an embodiment of the present invention will be described in detail with reference to the drawings.

Figure 3:
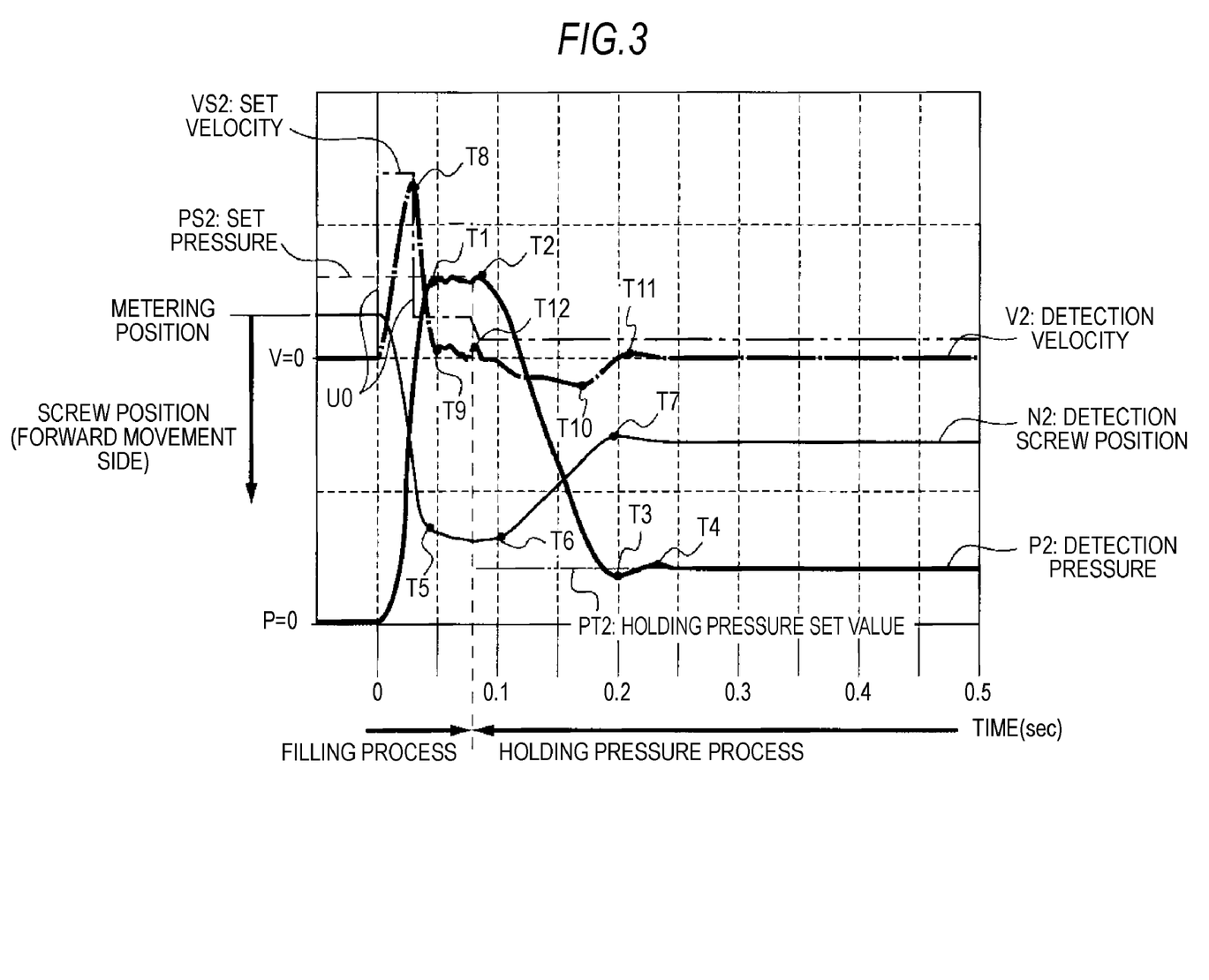
FIG. 3 is a graph showing the recorded waveforms of an injection velocity, a filling pressure, and a screw position in the case of molding by an injection molding method according to an embodiment of the present invention.
Figure 5:
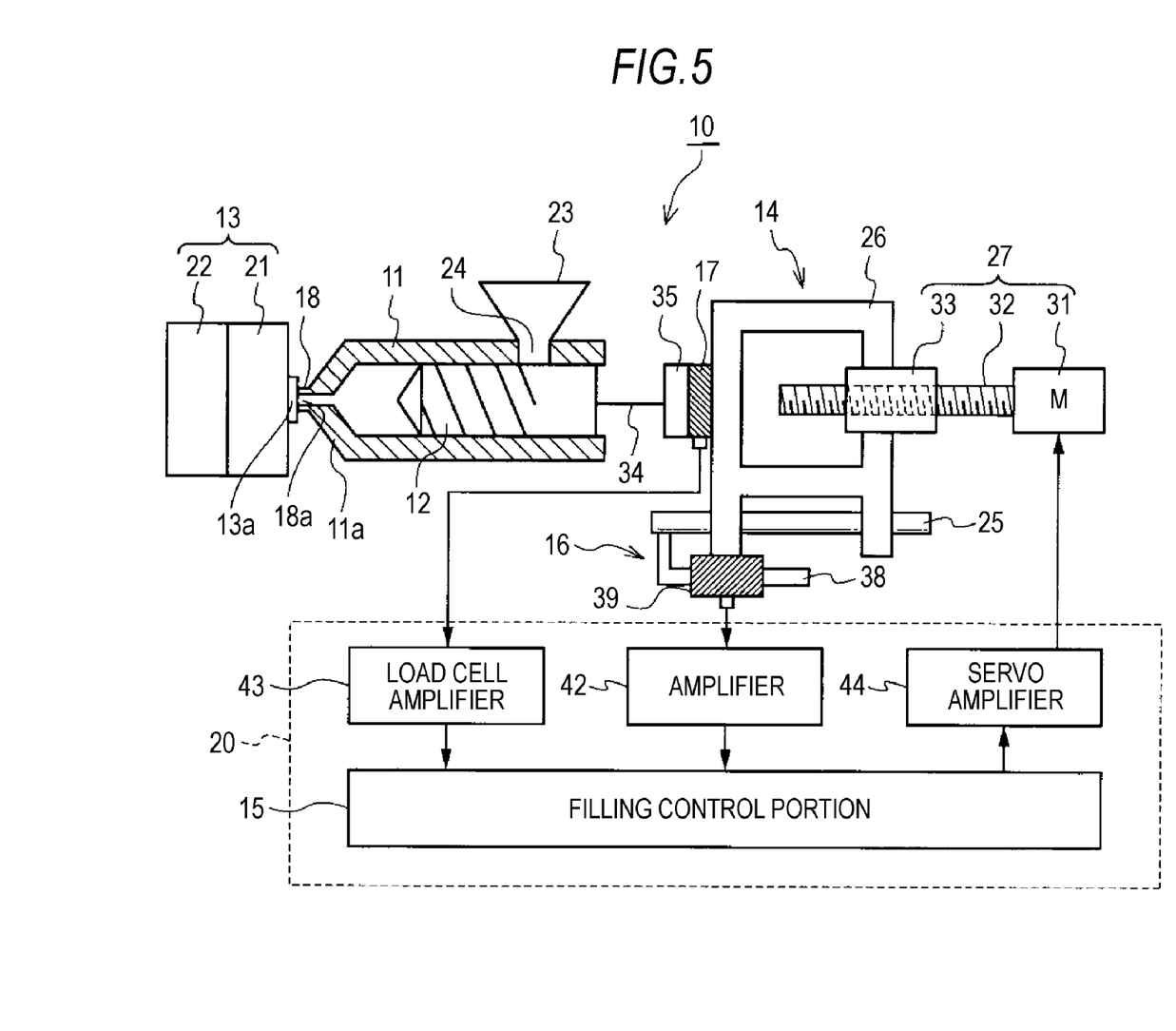
FIG. 5 is a block diagram used to describe the schematic configuration of the injection molding machine according to an embodiment of the present invention.
Figure 6:
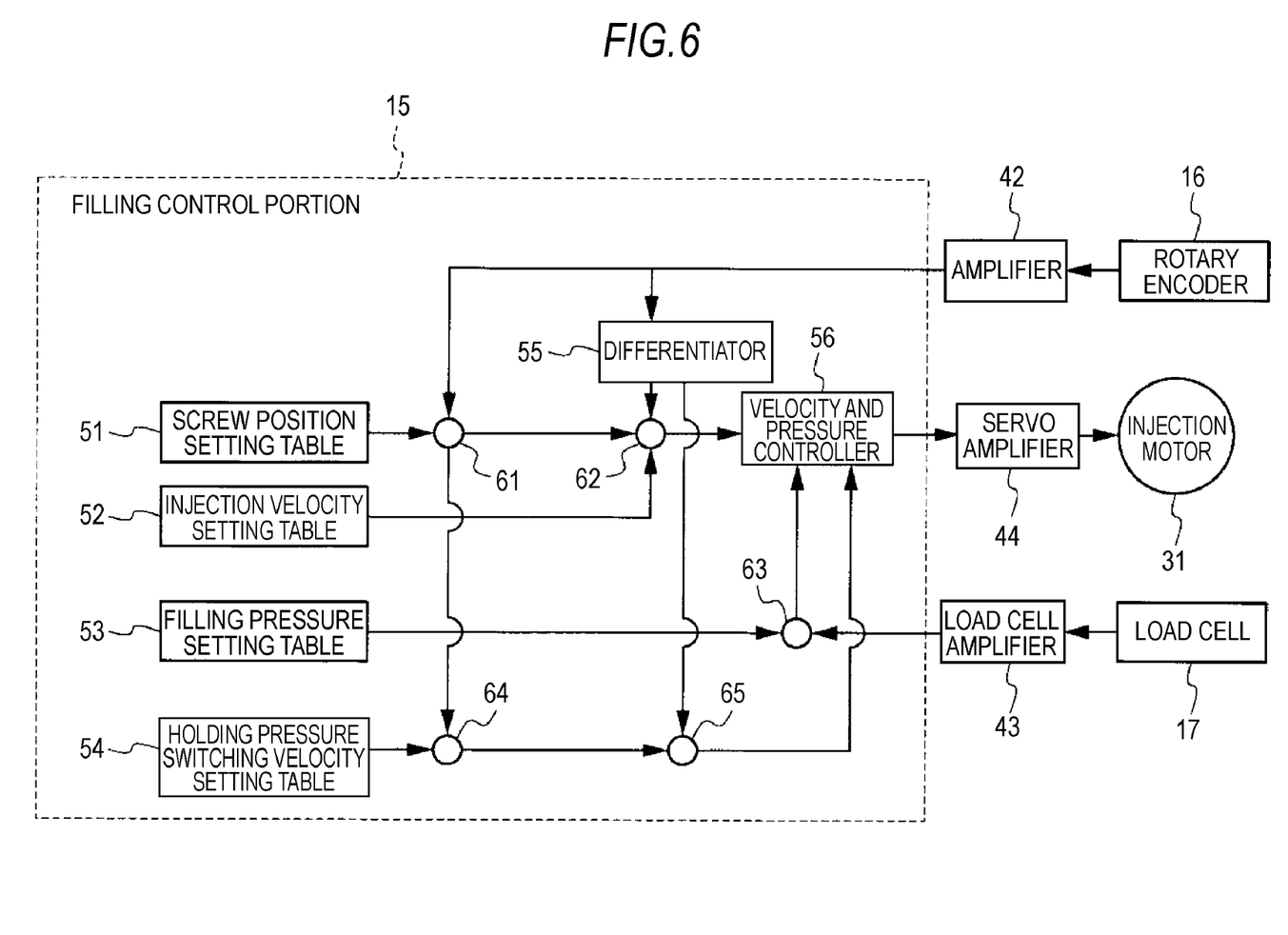
FIG. 6 is a block diagram used to describe the schematic configuration of a control portion in an injection control apparatus for the injection molding machine according to an embodiment of the present invention.
Figure 7:
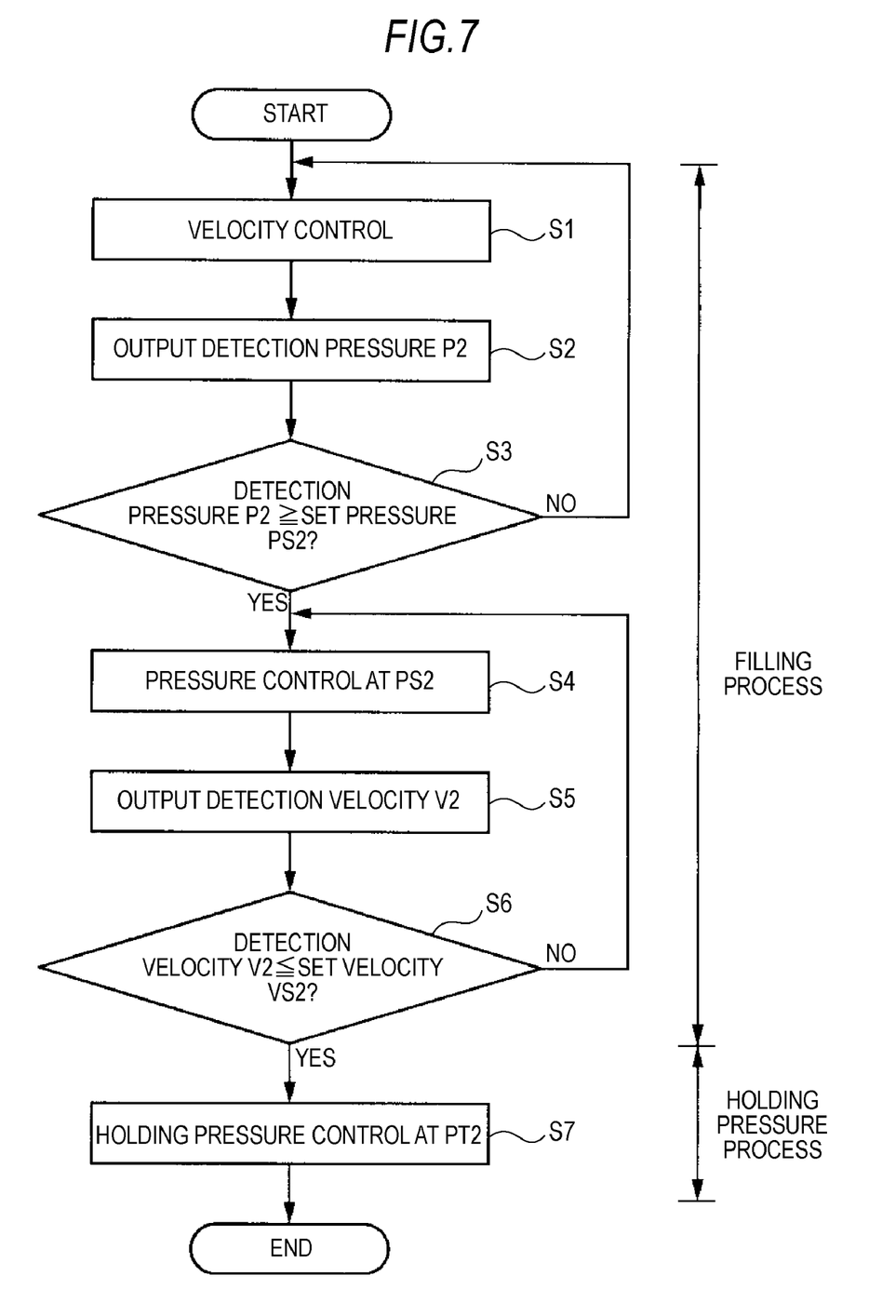
FIG. 7 is a flowchart used to schematically describe the control by the control portion in the injection control apparatus for the injection molding machine according to an embodiment of the present invention.

FIG. 5 is an explanatory view schematically showing the configuration of a control apparatus of injection molding according to an embodiment of the present invention. FIG. 6 is a block diagram showing a concrete example of the configuration of an injection control portion shown in FIG. 5. FIG. 7 is a flowchart depicting a concrete example of the control processing by the injection control portion 15 shown in FIG. 5. FIG. 3 is a graph used to describe the relation of detected values and set values of a velocity waveform, a pressure waveform, and a screw position in a case where the product of the shape and the configuration shown in FIG. 1 is molded by the molding method according to an embodiment of the present invention.

As is shown in FIG. 5, an injection molding machine 10 is a screw in-line type injection molding apparatus. The injection molding machine 10 includes a heating cylinder 11, a screw 12, a molding unit 13, a drive unit 14, an injection control portion 15, a velocity detection portion 16, and a pressure detection portion 17. The heating cylinder 11 is a concrete example of a cylinder member. One end of a cylindrical body formed in a circular cylindrical shape is closed by a conical closing portion 11a and an injection nozzle 18 is provided at the center of the closing portion 11a. The injection nozzle 18 is connected to a connection portion 13a of the molding unit 13 in an attachable and detachable manner.

The molding unit 13 includes a stationary die 21 as a first die, a movable die 22 as a second die provided to be movable forward and backward with respect to the stationary die 21, and an unillustrated clamping unit. By operating the unillustrated clamping unit, mold closing, mold clamping, and mold opening by the stationary die 21 and the movable die 22 are performed. A cavity space (space for molded article) is defined between the stationary die 21 and the movable die 22 during the mold clamping. To this end, the clamping unit includes an unillustrated stationary platen to which the stationary die 21 is attached, an unillustrated movable platen to which the movable die 22 is attached, and an unillustrated clamping motor as a clamping drive portion that not only moves the movable platen forward and backward but also generates a clamping force.

A hopper 23 that stores a molding material is attached to the heating cylinder 11 at a predetermined position in the rear portion in the axial direction. The hopper 23 is formed of a conical, cylindrical member and it is connected to the heating cylinder 11 with a feed opening 24 at the tip end on the tapered side. The hopper 23 stores unillustrated resin as a molding material and a predetermined amount of the molding material is fed inside the heating cylinder 11 via the feed opening 24. Thermoplastic, such as polycarbonate (PC), is a suitable example of the resin used as the molding material. However, thermosetting plastic is also available.

The screw 12 is a concrete example of an injection member, and it is rotatable within the space inside the heating cylinder 11. It is also inserted into the space to be movable forward and backward in the axial direction. The drive unit 14 that drives the screw 12 to rotate and move forward and backward is provided at the rear end of the screw 12. The drive unit 14 includes a guide bar 25 as a guiding member, a slide base 26 as a supporting member, a translatory movement portion 27 that moves the screw 12 forward and backward in the axial direction, and an unillustrated rotational movement portion that rotates the screw 12.

The guide bar 25 of the drive unit 14 is fixed to an unillustrated frame and the slide base 26 is guided by the guide bar 25 so that it is allowed to come close to and move apart from the heating cylinder 11. The translatory movement portion 27 has an injection motor 31 as an injection drive portion fixed to an unillustrated frame, a ball screw shaft 32 provided integrally with the rotation shaft of the injection motor 31, and a ball nut 33 meshed with the ball screw shaft 32. The ball nut 33 is fixed to the slide base 26, so that the slide base 26 is operated integrally with the ball nut 33 to move forward and backward in association with rotations of the ball screw shaft 32.

The unillustrated rotational movement portion has an unillustrated metering motor as a metering drive portion fixed to the slide base 26 and it serves as a rotation transmission system that transmits rotations generated by driving the metering motor to the screw 12. The screw 12 is coupled to a bearing 35 via a rod 34 and a load cell 17 as a concrete example of a pressure detection portion is coupled to the bearing 35. The load cell 17 detects a pressure of molten resin inside the heating cylinder 11 and is fixed to the slide base 26. The screw 12 is therefore supported on the slide base 26 in a rotatable manner via the bearing 35 and the load cell 17.

In the metering process, by rotating the screw 12 forward by the driving of the unillustrated metering motor, the resin inside the hopper 23 is fed inside the heating cylinder 11 through the feed opening 24 and forced forward in the groove of the screw 12. Accordingly, by moving the screw 12 backward, the resin that is being melted by heating is forced forward and stored ahead of a screw head at the front end of the screw 12.

Subsequently, in the injection process, by moving the screw 12 forward by the driving of the injection motor 31, the molten molding material (resin) stored ahead of the screw head is injected from the nozzle opening 18*a* of the injection nozzle 18. The molten resin is thus introduced into the two dies 21 and 22 of the molding unit 13 and fed into the cavity space by flowing the runner portion 3 and then the gate portion 4. After the molten resin has passed by the product thin portion 5, it is filled in the cavity space. As will be described below, it is preferable that a zone in which the control is switched from the velocity control to the pressure control falls within the filling process for the runner and gate portions.

The injection molding machine 10 configured as described above is able to control the injection velocity and the injection pressure. To this end, the load cell 17 is provided as the pressure detection portion and the position detector 16 is provided as the velocity detection portion. The position detector 16 is provided between the guide bar 25 and the slide base 26.

As the position detector 16, for example, a rotary encoder is available. It includes a stator 38 as a first detection element attached to the guide bar 25 and a rotor 39 as a second detection element attached to the slide base 26. By allowing the rotor 39 to move relatively with respect to the stator 38, it becomes possible to know the position of the screw 12 by checking the position of the rotor 39. A sensor output of the rotor 39 specifying the position of the screw 12 is sent to the filling control portion 15 via an amplifier 42. Also, a sensor output of the load cell 17 specifying a load transmitted to the slide base 26 when the injection motor 31 is driven is sent to the filling control portion 15 via a load cell amplifier 43. By differentiating the detected position in the filling control portion 15, the velocity can be found through differential calculus.

A servo amplifier 44 is electrically connected to the filling control portion 15 and the injection motor 31 is electrically connected to the servo amplifier 44. This configuration enables the filling control portion 15 to perform predetermined arithmetic processing according to information about the velocity control supplied via the amplifier 42 and information about the load control supplied via the load cell amplifier 43. The filling control portion 15 then outputs the result of the arithmetic processing in the form of a predetermined control signal to the injection motor 31 via the servo amplifier 44 to drive the injection motor 31 under control. The filling control portion 15, the amplifier 42, the load cell amplifier 43, and the servo amplifier 44 together form a control apparatus 20 of injection molding.

The filling control portion 15 has a configuration as shown in FIG. 6. More specifically, the filling control portion 15 includes four setting tables 51 through 54 as storage portions (memory devices) provided apart from the main memory device and an auxiliary memory device, a differentiator 55, a velocity and pressure controller 56, and five comparators 61 through 65. The screw position setting table 51 is a region in which to pre-store a position used as the reference for controlling the screw position, and a predetermined value (set position value) used as a reference value that is preliminarily determined through calculation or experiments is stored therein. The injection velocity setting table 52 is a region in which to pre-store an injection velocity used as the reference for controlling the injection velocity V, and a predetermined value (set velocity value) used as a reference value that is preliminarily determined through calculation or experiments is stored therein.

The filling pressure setting table 53 is a region in which to pre-store a filling pressure P used as the reference for controlling the filling pressure, and a predetermined value (set pressure value PS2) used as a reference value that is preliminarily determined through calculation or experiments is stored therein. Likewise, the holding pressure switching velocity setting table 54 is a region in which to pre-store a holding pressure switching velocity used as the reference for controlling the holding pressure switching velocity, and a predetermined value (set holding pressure velocity switching value) used as a reference value that is preliminarily determined through calculation or experiments is stored therein. The differentiator 55 is capable of calculating the velocity by differentiating a value of the detection signal supplied from the rotary encoder (position detector) 16. The velocity and pressure controller 56 makes a determination as to the switching from the velocity control to the pressure control.

With the configuration described above, the filling of the molten molding material metered in the region at the tip end inside the heating cylinder 11 into the cavity space (space for molded article) inside the die starts when the injection motor 31 is driven by the injection signal. In this instance, the pressure of the molding material inside the heating cylinder 11 is detected by the load cell 17 and the pressure detection signal is supplied to the filling control portion 15 via the load cell amplifier 43. At the same time, the position of the screw 12 is detected by the rotary encoder 16 and the position detection signal is supplied to the filling control portion 15 via the amplifier 42.

Accordingly, in the filling control portion 15, the first comparator 61 first compares the detection position value from the rotary encoder 16 obtained by detecting the position of the screw 12 with the set position value stored in the screw position setting table 51. The comparison result by the first comparator 61 is supplied to the second comparator 62 and the fourth comparator 64. The second comparator 62 compares a detection velocity value of the filling velocity from the differentiator 55 obtained by differentiating the position detection signal supplied from the rotary encoder 16, the set velocity value of the injection velocity stored in the injection velocity setting table 52, and the position determination value, which is the comparison result by the first comparator 61. Accordingly, a signal corresponding to the velocity based on the comparison result is outputted to the velocity and pressure controller 56. A signal from the third comparator 63 and a signal from the fifth comparator 65 are supplied to the velocity and pressure controller 56. According to these signals, a control signal is outputted to the servo amplifier 44 from the velocity and pressure controller 56, and the injection motor 31 is driven under control by this control signal.

At the V-P switching zone in the filling process, the third comparator 63 compares the detection pressure value according to the pressure detection signal supplied from the load cell 17 via the load cell amplifier 43 with the set pressure value stored in the filling pressure setting table 53. The switching pressure is thus determined, and when the detection pressure value reaches the set pressure value of the preset filling pressure, the control is switched from the velocity control to the pressure control by the velocity and pressure controller 56.

Subsequently, in the switching zone to the holding pressure, the detection velocity of the screw 12 is compared in the fourth comparator 64 and the fifth comparator 65. More specifically, the fourth comparator 64 compares the position determination value of the screw 12 supplied from the first comparator 61 with the set holding pressure switching velocity value for the holding pressure velocity switching stored in the holding pressure switching velocity setting table 54. The comparison result and the detection velocity value of the injection velocity supplied from the differentiator 55 are supplied to the fifth comparator 65. The fifth comparator 65 then compares the detection velocity value with the set holding pressure switching velocity value and the control is switched to the holding pressure process by the velocity and pressure controller 56 when the detection velocity value reaches the set holding pressure switching velocity value.

FIG. 3 shows the relation of a velocity waveform, a pressure waveform, and a screw position in the case of molding by the molding method and the control according to an embodiment of the present invention by way of example. Referring to FIG. 3, a graph indicated by a thick solid line represents a detection pressure P2, a graph indicated by a thin solid line represents a detection screw position N2, and a graph indicated by a thick alternate long and short dash line represents a detection speed V2. In FIG. 3, the abscissa is used for the molding time. It shows an elapse of 0.5 second from the start of molding. About 0.08 second from the start of molding is the control of the filling process and the control shifts to the holding pressure process thereafter.

Referring to FIG. 3, by operating the injection molding machine 10, the filling is performed by the velocity control and the screw 12 moves forward (moves downward in FIG. 3). Then, the detection pressure P2 rises (upward in FIG. 3) abruptly from the start of molding. When the detection pressure P2 reaches the first set pressure PS2 at a time point T1 (about 0.05 second from the start), the control is switched from the velocity control to the pressure control. The screw 12 thus changes to a fine forward movement at a time point T5 and keeps moving forward slightly up to a time point T6. During this period, the detection pressure P2 maintains almost the same pressure from the time point T1 to a time point T2. The pressure during this period is a pressure exerted upon release of the internal energy accumulated in the molten resin as the compressive strength, which is a physical property of the resin. With this pressure, it is possible to maintain almost the same pressure by the internal energy by merely maintaining the position of the screw 12 at the current position.

By utilizing the internal energy accumulated in the resin in this manner, it is possible to maintain the pressure at the moment without having to raise the pressure by moving the screw 12 forward. It thus becomes possible to prevent an increase of the peak value of the pressure when the filling ends as was described in the related art. The resin can be therefore spread in every corner of the cavity space at a relatively low pressure. A time point when the control is switched from the velocity control to the pressure control is before the filling is completed.

At and after the time point T2, the detection pressure P2 drops abruptly and it drops to a pressure of almost zero (0) at a time point T3 (about 0.2 second from the start). Subsequently, the detection pressure P2 starts to rise slightly and shifts to a preset specific pressure (holding pressure set value PT2) at a time point T4 (about 0.23 second from the start) and holds this pressure thereafter. In this instance, the detection screw position N2 maintains almost the same position up to a time point T6 (about 0.1 second from the start), after which it changes to a backward movement. It returns to almost half the distance at a time point T7 (about 0.19 second from the start) and maintains this position thereafter.

The detection velocity V2 rises from the start of molding and changes from the acceleration side to the deceleration side before it reaches the set velocity VS2 at a time point T8 (about 0.03 second from the start). It is returned to almost zero at a time point T9 (about 0.05 second from the start). More specifically, the value of the set velocity VS in this instance is a velocity of almost zero (0). Subsequently, the detection velocity V2 gradually changes to a minus direction and changes to rise at a time point T10 (about 0.17 second from the start). It then returns to the initial velocity of almost zero (0) at a time point T11 (about 0.2 second from the start) and maintains this stopped state.

In this manner, according to an embodiment of the present invention, the molding material is metered as the screw 12 moves backward, and the resin is kept filled by the velocity control until the detection value of the filling pressure reaches the first set pressure value PS2. Subsequently, at a time point when the detection pressure value P2 reaches or exceeds the first set pressure value PS2, the control is switched from the velocity control to the pressure control by which the control is performed at the first set pressure value PS2 and the filling of the resin is continued. At a time point when the filling velocity drops to or below the set velocity, the control is performed so as to switch the control to the holding pressure control by which the control is performed at the second set pressure value (PT2).

As has been described, injection of the molding material into the die is started by the velocity control according to the set velocity and the injection control apparatus 20 starts to monitor the injection pressure after the injection is started. When the filling pressure reaches the V-P switching value (time point T1) during the filling process, deceleration of the screw 12 is started (time point T8) even when the injection velocity is equal to or lower than the set velocity VS2. Thereafter, the screw 12 is controlled at the filling pressure (time point T2) and the filling of the molding material is continued. In the vicinity of the time point T5, the screw 12 moves forward slightly to the time point T6 regardless of the fact that the filling pressure is almost constant from the time point T1 to the time point T2. It is therefore understood that the filling of the molding material is continued. Accordingly, by checking the detection pressure value P2, it becomes possible to know that no peak pressure is occurring, which is uncontrollable by the control method in the related art.

In short, an embodiment of the present invention is characterized by the switching method from the filling process to the holding pressure process and a manner in which the control is performed. In the related art, when the control shifts from the injection process to the holding pressure process, the screw position and the resin pressure are detected and the control is switched by determining whether the detected values coincide with the set values. On the contrary, an embodiment of the present invention is characterized in that a forward moving velocity of the screw 12 is monitored in the process at the end of filling and the control is switched to the holding pressure process by automatically determining the completion of filling when the velocity of the screw 12 reaches the set value in the vicinity of zero. It thus becomes possible to achieve the advantages unique to an embodiment of the present invention as described above.

Also, as is obvious from FIG. 3, the injection control apparatus 20 automatically determines the completion of filling when the velocity of the screw 12 has reached the velocity at the time point T12 and switches the control to the holding pressure process. It thus becomes possible to switch the filling pressure to the holding pressure continuously without causing an overshoot. This proves that the molding material can be automatically flown in every corner of the cavity space with the internal energy applied to the molding material by merely holding the filling pressure at the moment without having to raise the filling pressure further.

As has been described, according to an embodiment of the present invention, by utilizing the internal energy induced by the compression action and accumulated in the molding material in the filling process, it becomes possible to prevent a peak pressure from occurring during the filling, which occurs by the molding method in the related art. The filling process is thus enabled at a low pressure. Also, when the control is switched from the filling process to the holding pressure process, continuous control is enabled without causing over packing or depressurization. In addition, by switching the velocity control by which the filling velocity of the molten resin is switched according to the position of the screw 12 and the pressure control by which the filling pressure is switched according to the position of the screw 12 in multiple stages and performing the pressure control in the final stage, a molded article with satisfactory finishing can be produced efficiently at a high yield rate. Further, by performing the pressure control in the final stage, it becomes possible to suppress the occurrence of an excessive peak pressure by understanding the filling status of the cavity space inside the die.

FIG. 7 is a flowchart of an example of the control by the filling control portion 15 shown in FIG. 6 in the injection control apparatus 20 for the injection molding machine 10 according to an embodiment of the present invention. The flowchart schematically shows an operation of the filling control portion 15 having the configuration shown in FIG. 6. The contents can be briefly described as follows.

Initially, the velocity control in the filling process to obtain a molded article by injection molding is performed in Step S1. To this end, the position of the screw 12 is detected using the rotary encoder (position detector) 16 to calculate a velocity of the screw 12 according to the position detection signal. Then, the screw 12 is moved at a predetermined velocity by operating the drive unit 14. Subsequently, the flow proceeds to Step S2, in which the resin pressure applied on the screw 12, that is, a pressure during the filling conferred to the screw 12 from the molten molding material, is detected and the resulting detection pressure P2 is outputted. It should be noted that the screw 12 keeps moving at the predetermined velocity during this period.

Subsequently, the flow proceeds to Step S3, in which the detection pressure P2 is compared with the first set pressure PS2. When the detection pressure P2 is lower than the first set pressure PS2 (P2<PS2), the flow returns to Step S1 and the processing described above is repeated. Meanwhile, when the detection pressure P2 is equal to or higher than the first set pressure PS2 (P2≧PS2), the flow proceeds to Step S4. Step S1 through Step S3 are the processing for the velocity control in the filling process.

Subsequently, in Step S4, the control is switched from the velocity control to the pressure control in the filling process to perform the pressure control at the first set pressure PS2. The flow then proceeds to Step S5, in which the detection velocity V2 of the screw 12 obtained by detecting the position of the screw 12 is calculated and a signal corresponding to the detection velocity V2 is outputted.

Subsequently, the flow proceeds to Step S6, in which the detection speed V2 is compared with the set speed VS2. When the detection velocity V2 is higher than the set velocity VS2 (V2>VS2), the flow returns to Step S4 and the processing in Step S4 through Step S6 is repeated. Meanwhile, when the detection speed V2 is equal to or lower than the set speed VS2 (V2≦VS2), the flow proceeds to Step S7. Step S4 through Step S6 are the processing for the pressure control in the filling process. Step S1 through Step S6 form the filling process to fill the molten molding material into the die, which corresponds to the filling process shown in FIG. 3.

Subsequently, the holding pressure control at the holding pressure set value PT2, which is the second set pressure value, is performed in Step S7. This holding pressure control corresponds to the holding pressure process shown in FIG. 3. The holding pressure process is managed by an unillustrated timer. The processing ends at this point. Accordingly, even a product of a shape as is shown in FIG. 1 can be manufactured efficiently at a high yield rate by following the processes described above.

It should be appreciated that an embodiment of the present invention is also applicable to a runnerless method, such as a hot runner type.

According to an embodiment of the present invention, by switching the control from the velocity control to the pressure control in the middle of the filling process, it becomes possible to perform injection molding at a pressure lower than the pressure in the molding method in the related art by utilizing the internal energy of the molding material being filled. In particular, in the case of thin molding, not only can the moldability be improved, but also remaining stress of the molded article can be reduced. Also, the maximum injection pressure can be lowered according to an embodiment of the present invention. Hence, not only can the molding energy be reduced, but also the life of the die can be prolonged. It thus becomes possible to reduce the cost of the die by designing the die with low rigidity. It is therefore expected that the life of the injection molding machine using such a die can be also prolonged.

Further, according to an embodiment of the present invention, it is possible to switch the control to the holding pressure process while ensuring the continuity of pressure without causing depressurization by filling the molding material at a higher density by the pressure control. Consequently, it is possible to achieve the advantages that a sink mark in a molded article can be prevented and the occurrence of poor filling can be prevented. In addition, it is possible to achieve an advantage that a molded article can be more uniform in thickness. Moreover, because it is possible to control the filling pressure and the pressure in the holding pressure process, a remaining pressure of a molded article can be lowered, which makes it possible to improve accuracy of the shape by reducing a dimensional variance of the molded article. Furthermore, because the switching control to the holding pressure is performed at a forward moving velocity of the screw, it becomes possible to prevent the occurrence of over packing.

As has been described, according to an embodiment of the present invention, the filling control is switched from the velocity control to the pressure control at a time point when the internal energy is accumulated in the molding material by detecting a pressure of the molding material being filled during the multi-stage injection process. Thereafter, in order to utilize the internal energy of the molding material, the injection (filling) pressure is controlled to be continuously flat so that the occurrence of a peak pressure is controlled. The filling at a relatively low pressure is thus enabled. Also, in the final stage of the filling process, the backward movement of the screw, which indicates that the filling of the cavity is almost completed, is detected by monitoring the injection velocity of the screw and comparing it with the set velocity, after which the control is switched from the injection process to the holding pressure process. This configuration makes it possible to prevent over packing, which can in turn eliminate an overshoot of injection pressure that occurs immediately after the filling. Hence, not only can the quality of a molded article be improved, but also the life of the die can be prolonged.

While the present invention has been described by way of embodiments, it should be appreciated that the present invention is not limited to the embodiments described above and shown in the drawings and the present invention can be modified in various manners without deviating from the scope of the present invention.

The present application contains subject matter related to that disclosed in Japanese Priority Patent Application JP filed in Japan Patent Office on Jun. 20, 2008, the entire contents of which is hereby incorporated by reference.

What is claimed is:

1. A control method of injection molding comprising the steps of:
    filling molten resin in an injection molding die by velocity control until a detection value of a filling pressure of the molten resin reaches a first set pressure value;
    filling the molten resin by switching control from the velocity control to pressure control by which the control is performed at the first set pressure value at a point in time when the detection value of the filling pressure reaches or exceeds the first set pressure value; and
    switching the control to holding pressure control by which the control is performed at a second set pressure value at a point in time when the filling velocity drops to or below a set velocity while filling is performed by the pressure control.

2. The control method of injection molding according to claim 1,
    wherein the resin flows by utilizing internal energy accumulated in the resin while the pressure control is performed.

3. The control method of injection molding according to claim 1,
    wherein a point in time when the control is switched from the velocity control to the pressure control is before the filling is completed.

4. The control method of injection molding according to claim 1,
    wherein a zone in which the control is switched from the velocity control to the pressure control falls within a filling process for runner and gate portions.

5. The control method of injection molding according to claim 1,
    wherein a value of the set velocity is a velocity of almost zero.

6. The control method of injection molding according to claim 1,
    wherein the filling velocity is obtained through differential calculus of a detection value found using a rotary encoder by detecting a rotation number of an injection motor that operates an injection member to fill the resin.

7. The control method of injection molding according to claim 1,
    wherein the velocity control by which the filling velocity is switched according to a position of a screw and the pressure control by which the filling pressure is switched according to the position of the screw are switched in multiple stages and the pressure control is performed in a final stage.

8. The control method of injection molding according to claim 7,
    wherein an occurrence of an excessive filling peak pressure is suppressed by understanding a filling status of a cavity space inside the die by performing the pressure control in the final stage.

9. A control apparatus of injection molding comprising:
    a pressure detection portion that detects a filling pressure of resin being filled in an injection molding die;
    a velocity detection portion that detects a filling velocity of the resin; and
    a filling control portion that fills molten resin by velocity control according to a velocity detected by the velocity detection portion until the filling pressure of the molten resin detected by the pressure detection portion reaches a first set pressure value, switches control from the velocity control to pressure control by which the control is performed at the first set pressure value at a point in time when a detection value of the filling pressure detected by the pressure detection portion reaches or exceeds the first set pressure value, and switches the control to holding pressure control by which the control is performed at a second set pressure value at a point in time when the filling velocity detected by the velocity detection portion drops to or below a set velocity while filling is performed by the pressure control.

10. The control apparatus of injection molding according to claim 9, wherein the filling control portion switches the control from the velocity control to the pressure control before the filling is completed.

11. The control apparatus of injection molding according to claim 9, wherein the filling control portion switches the control from the velocity control to the pressure control according to a status of the resin in runner and gate portions.

12. The control apparatus of injection molding according to claim 9, wherein the filling control portion switches the control to the holding pressure control when a value of the set velocity is a velocity of almost zero.

13. The control apparatus of injection molding according to claim 9, wherein the velocity detection portion obtains the filling velocity through differential calculus of a detection value found using a rotary encoder by detecting a rotation number of an injection motor that operates an injection member to fill the resin.

* * * * *